United States Patent Office.

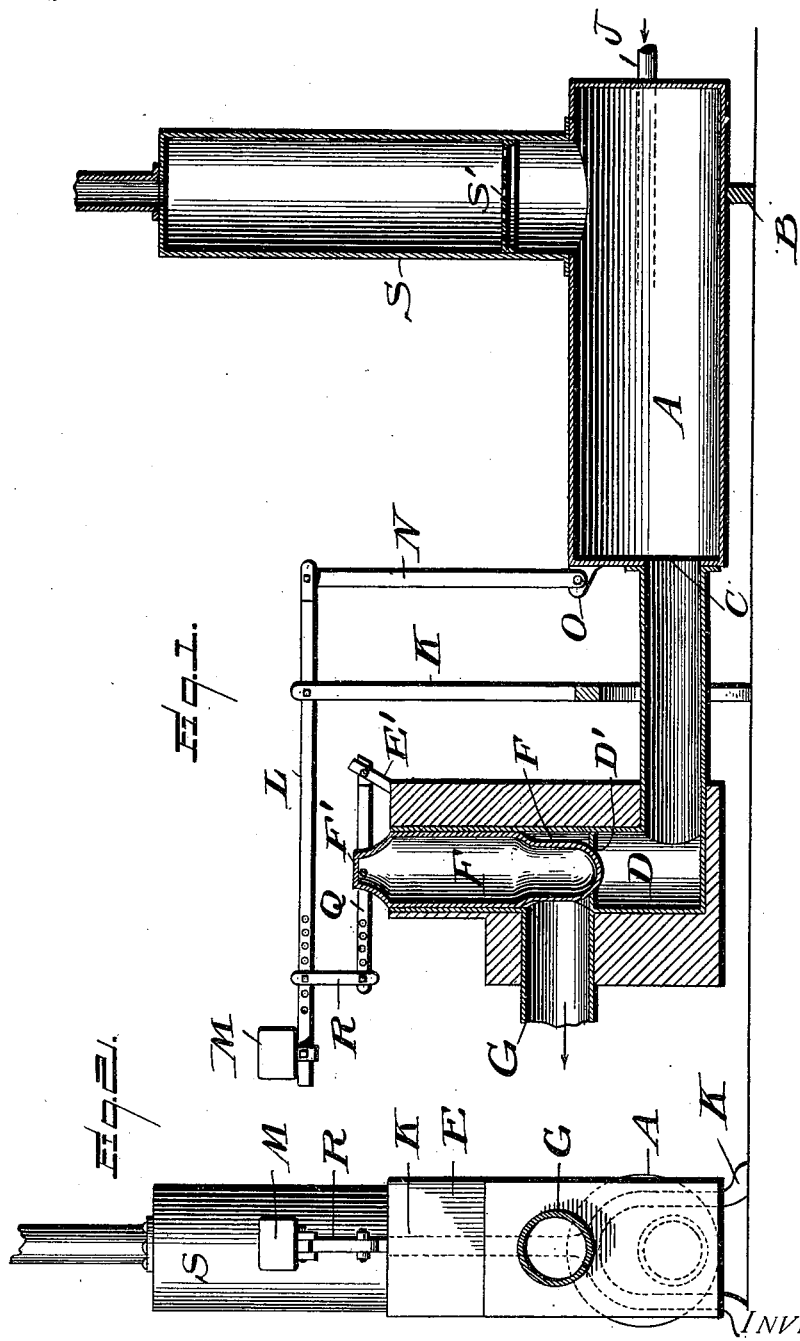

JOHN W. HOUGH, OF MARION, INDIANA.

GAS-SEPARATOR.

SPECIFICATION forming part of Letters Patent No. 650,937, dated June 5, 1900.

Application filed February 24, 1900. Serial No. 6,417. (No model.)

*To all whom it may concern:*

Be it known that I, JOHN W. HOUGH, a citizen of the United States, residing at Marion, in the county of Grant and State of Indiana, have invented certain new and useful Improvements in Automatic Separator-Valves; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for separating water, oil, and gas, and especially to an automatic separator-valve whereby when a sufficient quantity of water and oil has accumulated in a reservoir or tank so as to overcome a weight carried by a pivoted lever having connection with said tank the latter will tilt, and a plunger drawn away from a valve-seat, thereby allowing the oil and water to discharge through an outlet passage-way, suitable means being provided to allow the gas to escape through a passage-way extending in an upright direction from the reservoir.

To these ends and to such others as the invention may pertain the same consists, further, in the novel construction, combination, and adaptation of parts, as will be hereinafter more fully described and then specifically defined in the appended claims.

My invention is clearly illustrated in the accompanying drawings, which, with the letters of reference marked thereon, form a part of this application, and in which drawings similar letters of reference indicate like parts throughout both views, in which—

Figure 1 is a central longitudinal view through the apparatus. Fig. 2 is an end elevation.

Reference now being had to the details of the drawings by letter, A designates a reservoir or tank which is supported at one side of its middle portion, preferably near one end, on a block B, on which said reservoir is adapted to tilt. Leading from one end of said reservoir is an outlet passage-way C, which opens into the boxing D, having an aperture in its upper wall, the walls of which aperture are beveled, as at D', forming a valve-seat. Extending in an upright direction from said boxing is a hollow cylindrical chamber E, in which a plunger F works. Said plunger has its lower end rounded and is adapted to normally rest on said valve-seat to close the aperture in the upper wall of said boxing. Leading away from the lower end of said cylindrical chamber is an exit-pipe G, through which the water and oil from the reservoir pass when the latter tilts, which causes the plunger to be drawn from the valve-seat.

Pivoted to the upper end of the standard K is a lever L, on one end of which is carried a weight M, which may be adjustably held thereon, if desired, and the opposite end of the lever L is pivoted to a rod N, which latter at its lower end is pivoted to a projection O of the reservoir A. Pivoted to an arm E' on the cylindrical chamber E is a lever Q, to which the upper end of the plunger F is pivoted, as at F', while at the extreme outer end of said lever Q is pivoted a link R, which in turn is pivoted to the lever L.

Extending in an upright direction from the reservoir A is a pipe S, which opens at its lower end into said reservoir and has an aperture in its opposite end through which the gas is allowed to escape and about which may be secured a pipe to convey away the gas which separates from the water and oil. At any suitable location within said pipe S is located a perforated disk S', which is a water-brake and is provided to condense any moisture that might rise with the gas from the reservoir. A suitable inlet-pipe J is provided, which leads into the reservoir and through which the water, oil, and gas may pass to said reservoir or tank A.

In operation when a sufficient quantity of water, gas, and oil enters the reservoir to overcome the weight on the lever L said reservoir will tilt, and by means of the lever connections between the reservoir and the plunger the latter will be raised as the valve-seat lowers, and the water and oil pass through the outlet passage-way. The gas, which enters the reservoir, rises through the pipe S, and when a sufficient quantity of the water and oil has passed out the weight on lever L will cause the reservoir to return to its normal position, and the plunger will be seated over the outlet-aperture in the upper wall of the boxing. From the foregoing it will be noted that the apparatus is operated automatically each time the reservoir becomes filled.

Having thus described my invention, what I claim to be new, and desire to secure by Letters Patent, is—

1. An apparatus for separating water, gas and oil, comprising the reservoir, having a passage-way through which the water and oil pass, the inlet-pipe J, and gas-outlet pipe, a standard, a lever pivoted thereto, a rod pivoted at one end to said lever, and its other end connected to the end of said reservoir, a weight on said pivoted lever, a plunger and lever connections between same and the weighted lever, said plunger normally seated over a valve-aperture in the passage-way leading from the reservoir, as set forth.

2. In combination, in an automatic separator and valve, the reservoir mounted to tilt, an inlet-pipe J leading therein, a gas-outlet, an outlet passage-way leading from said reservoir, a valve-seat in said passage-way, a cylindrical casing, a plunger working therein, and adapted to normally rest on said valve-seat, a standard, a lever pivoted thereto, a weight carried on said lever, the rod pivoted at its lower end to said reservoir, its other end to said lever, the lever pivoted to an extension of the cylindrical chamber and having pivotal connections with the plunger, and the link pivoted between said levers, as shown and described.

In testimony whereof I affix my signature in presence of two witnesses.

JOHN W. HOUGH.

Witnesses:
  LUTHER P. HESS,
  ERASTUS T. HOLLINGSWORTH.